(12) United States Patent
Kursun et al.

(10) Patent No.: US 9,760,702 B1
(45) Date of Patent: Sep. 12, 2017

(54) SYSTEMS AND METHODS FOR DRIVER AUTHENTICATION THROUGH EMBEDDED SENSING

(71) Applicant: JPMorgan Chase Bank, N.A., New York, NY (US)

(72) Inventors: Eren Kursun, New York, NY (US); Sih Lee, Northvale, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 14/555,083

(22) Filed: Nov. 26, 2014

Related U.S. Application Data

(60) Provisional application No. 62/024,398, filed on Jul. 14, 2014.

(51) Int. Cl.
| | | |
|---|---|---|
| *G06F 7/04* | (2006.01) | |
| *G06F 21/32* | (2013.01) | |
| *G06F 9/46* | (2006.01) | |

(52) U.S. Cl.
CPC .............. *G06F 21/32* (2013.01); *G06F 9/466* (2013.01)

(58) Field of Classification Search
CPC ................................ G06F 21/575; G06F 21/31
USPC ............................................................ 726/19
See application file for complete search history.

(56) References Cited

U.S. PATENT DOCUMENTS

| | | | | |
|---|---|---|---|---|
| 2012/0245763 A1* | 9/2012 | Mizuno | ................ | B60K 28/063 701/2 |
| 2014/0129379 A1* | 5/2014 | Tryba | ................. | G06Q 30/0639 705/26.8 |
| 2014/0310788 A1* | 10/2014 | Ricci | ....................... | B60Q 1/00 726/6 |

\* cited by examiner

*Primary Examiner* — Anthony Brown
(74) *Attorney, Agent, or Firm* — Hunton & Williams LLP

(57) ABSTRACT

Systems and methods for driver authentication through embedded sensing are disclosed. In one embodiment, a system for driver authentication through embedded sensing may include a vehicle that may include a plurality of sensors, each sensor sensing at least one of a characteristic of a vehicle occupant and a movement of the vehicle occupant; at least one computer processor executing a computer application, the computer application receiving and processing data from the plurality of sensors; and a communication interface. The system may further include a back-end server in communication with the vehicle communication interface and a plurality of locations in communication with the back-end server. In one embodiment, the characteristic may be a biometric characteristic of the vehicle occupant.

17 Claims, 4 Drawing Sheets

SYSTEMS AND METHODS FOR DRIVER AUTHENTICATION THROUGH EMBEDDED SENSING

This application is a nonprovisional application of U.S. Provisional Patent Application Ser. No. 62/024,398, entitled "Systems And Methods For Smart Vehicle Resident Mobile Banking Applications And Customized Biometrics Through Embedded Sensing," filed Jul. 14, 2014. It is also related to the following U.S. Provisional Patent applications: U.S. Provisional Patent Application Ser. No. 62/024,272, entitled "Systems And Methods For Transaction Pre-Fetching, Processing And Provisioning Through Intelligent Vehicle Electronic System And Back-End Cloud Infrastructure"; U.S. Provisional Patent Application Ser. No. 62/024,310, entitled "Systems And Methods For Self-Driving Or Self-Propelled Branch Automated Teller Machines For Secure Banking Applications"; and U.S. Provisional Patent Application Ser. No. 62/024,407, entitled "Systems And Methods For Predictive Resource Allocation And Location Optimization For Self Driving Bank Branch/ATMs." The disclosure of each of these provisional applications is hereby incorporated by reference in its entirety.

BACKGROUND OF THE INVENTION

1. Field of the Invention

The present invention generally relates to systems and methods for driver authentication through embedded sensing.

2. Description of the Related Art

Drive-through Automatic Teller Machines (ATMs) are commonly found in the United States and in other geographies. For routine banking transactions, a customer often drives to a bank, waits in the drive-through ATM queue, and, when it is his turn, conducts the transaction and is on his way.

SUMMARY OF THE INVENTION

Systems and methods for driver authentication through embedded sensing are disclosed.

In one embodiment, a system for driver authentication through embedded sensing may include a vehicle that may include a plurality of sensors, each sensor sensing at least one of a characteristic of a vehicle occupant and a movement of the vehicle occupant; at least one computer processor executing a computer application, the computer application receiving and processing data from the plurality of sensors; and a communication interface. The system may further include a back-end server in communication with the vehicle communication interface and a plurality of locations in communication with the back-end server. In one embodiment, the characteristic may be a biometric characteristic of the vehicle occupant.

In one embodiment, one or more of the plurality of sensors may be a sensor that senses a movement of the vehicle occupant.

In one embodiment, each of the sensors may sense a different movement of the vehicle occupant, and the computer application extracts at least one fused motor skill from the plurality of sensed movements. The movement may be associated with operating the vehicle.

In one embodiment, the locations may be an automated location or a manned location.

The vehicle may include a memory, and the memory may store a profile for the vehicle occupant based on at least one of the sensed characteristics of the vehicle occupant and the sensed movement of the vehicle occupant.

According to another embodiment, a method for establishing a driver profile using a plurality of embedded vehicle sensors may include (1) receiving, from a first vehicle sensor in a vehicle, a sensed physical characteristic for a vehicle occupant; (2) receiving, from at least one second vehicle sensor in the vehicle, a sensed movement for the vehicle occupant; and (3) the at least one computer processor creating a user profile from the sensed physical characteristic and the sensed movement data. The user profile may be used to authenticate the user for a transaction.

In one embodiment, a plurality of second vehicle sensors each senses a different movement of the vehicle occupant, and the at least one computer processor may extract at least one fused motor skill from the plurality of sensed movements.

In one embodiment, the movement may be associated with operating the vehicle, with responding to a traffic situation, etc.

In one embodiment, the sensed physical characteristic and the sensed movement data may be collected during operation of the vehicle.

In another embodiment, a method for authorizing a transaction may include the steps of (1) retrieving a vehicle occupant profile for an occupant of a vehicle; (2) receiving, from a first vehicle sensor in the vehicle, a sensed physical characteristic for the vehicle occupant; (3) receiving, from at least one second vehicle sensor in the vehicle, a sensed movement for the vehicle occupant; (4) at least one computer processor comparing the sensed physical characteristic and the sensed movement to the retrieved vehicle occupant profile; and (5) authenticating the driver by comparing the sensed driver data to the fused motor skill feature to the retrieved vehicle occupant profile.

In one embodiment, a plurality of second vehicle sensors may each sense a different movement of the vehicle occupant, and at least one computer processor may extract at least one fused motor skill from the plurality of sensed movements.

In one embodiment, the movement may be associated with operating the vehicle, with responding to a traffic situation, etc.

In one embodiment, the step of comparing the sensed physical characteristic and the sensed movement to the vehicle occupant profile may include the at least one computer processor generating a sensed profile from the sensed physical characteristic and the sensed movement data are collected during operation of the vehicle.

In one embodiment, the sensed physical characteristic and the sensed movement data may be collected during operation of the vehicle.

In one embodiment, the at least one computer processor may transmit the authentication to a third party.

In one embodiment, the at least one computer processor may grant the vehicle occupant access to a vehicle wallet and may conduct a transaction with the vehicle wallet.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
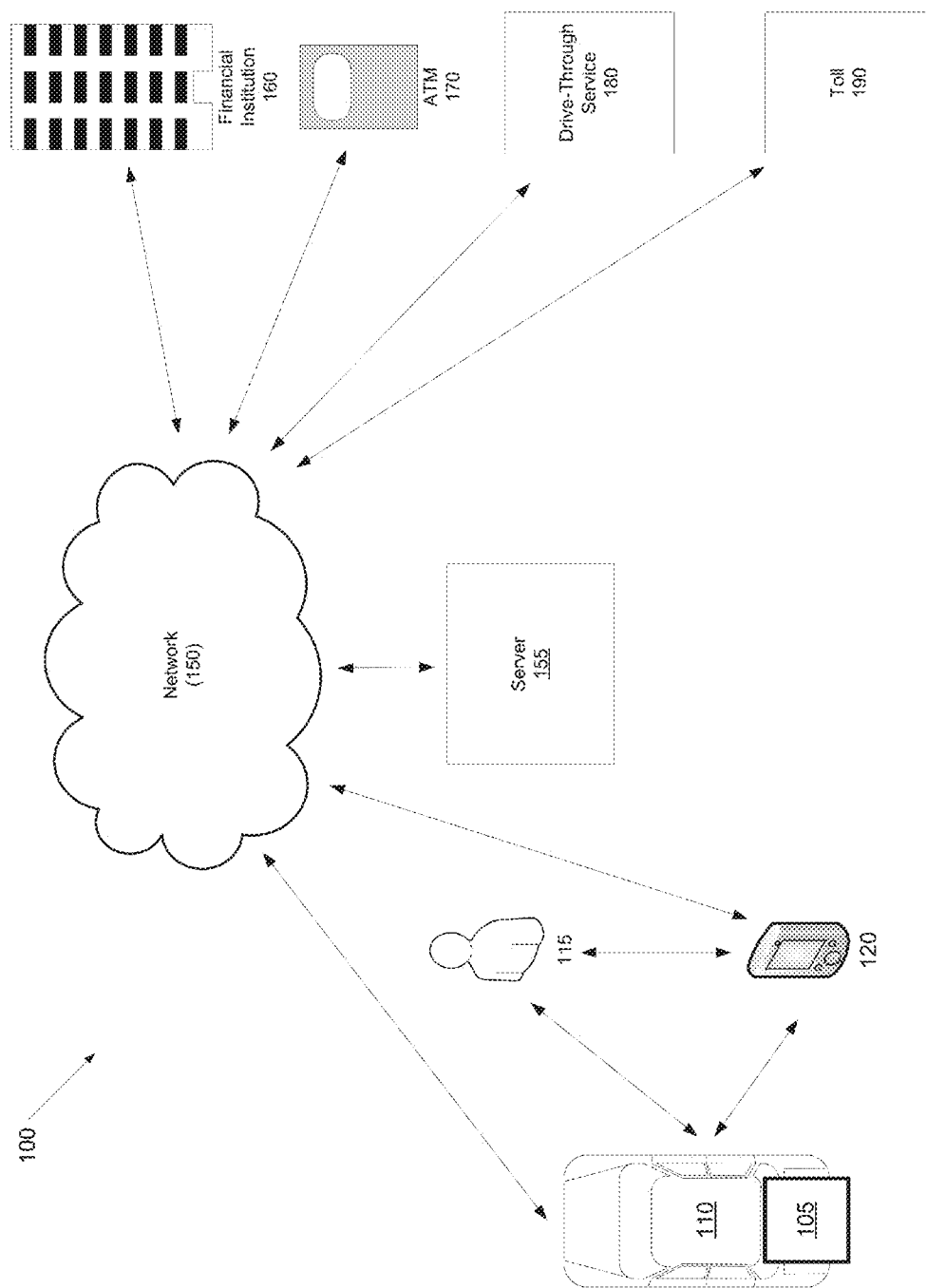
FIG. 1 is a block diagram of a system for driver authentication through embedded sensing according to one embodiment.

Several embodiments of the present invention and their advantages may be understood by referring to FIGS. 1-4.

According to one embodiment, a driver's driving habits and patterns may be used as a form of a biometric in order to authenticate a user to conduct a transaction, to enter a restricted area, etc. For example, the user's fine/coarse motor skills, impulse responses, driving speeds, reactions, etc., may be collected and compared to a profile that the driver has established.

While many drivers may like to use applications that require authentication while driving, is not easy—or sometimes even possible—to authenticate users using mobile devices, PINs, passwords etc. as this may distract the driver.

In one embodiment, vehicle sensors (e.g., cameras, voice recognition, weight sensors, pedal sensors, steering sensors, outside vehicle sensors (e.g., parking sensors, blind spot sensors, etc.), add-on devices (e.g., safe driver devices for insurance purposes, etc.), etc. may be used to authenticate the driver based on the user's personal biometrics (e.g., retina/iris scan, voice recognition, facial biometrics, weight, fingerprints, etc.) and/or the driver's driving habits (e.g., speed, acceleration/deceleration patterns, steering habits (e.g., hand positions, etc.), hand writing on touch screen devices reactions, impulse response patterns, steering habits, following closeness, facial/eye movements, body position (e.g., position of left foot, whether the user likes to hold on to the gearshift, etc.), etc.). Driving data may be collected from, for example, steering wheel sensors, gas pedal sensors, manual transmission sensors, combinations thereof, etc.

In one embodiment, a combination of the vehicle data may be considered together. For example, the data may be tied together temporally (e.g., the driver's gas pedal behavior may be tied with the driver's clutch pedal behavior, etc.). From the integrated data, unique identifiers may be extracted and a profile may be created. This profile may then be used to authenticate the individual (e.g., driver or passenger) so that the individual may conduct a transaction.

In one embodiment, the driver may be authenticated to use applications that are associated with the vehicle (e.g., a mobile banking application running on the vehicle's systems). In another embodiment, the driver may use the vehicle's systems to authenticate the driver to use an application on the driver's electronic device (e.g., an application on a smart phone). In still another embodiment, the driver may be authenticated to enter an area (e.g., a parking garage, a secure facility, etc.). In another embodiment, the driver may be authenticated to conduct a transaction using a vehicle wallet, a wallet on the driver's mobile device, etc.

In one embodiment, the driving biometrics may be combined with other biometric modalities to increase the reliability of the authentication.

In one embodiment, the driver profile may be used to authenticate the user so the user may operate the vehicle.

In one embodiment, separate data may be maintained and verified for more than one driver (e.g., a profile may be created for each family member, employee, etc.).

In one embodiment, the driver may be authenticated without an explicit authentication stage by using data that may be collected through a process that may run in the background.

In one embodiment, a vehicle may be provided with a "vehicle wallet." The vehicle wallet may be specific to the vehicle, and may reside in the vehicle's systems.

In one embodiment, the vehicle wallet may be dedicated to, or associated with a vehicle rather than an individual.

The vehicle wallet may comprise a mobile application component that resides on the existing intelligent vehicle hardware and operating system, a dedicated-trusted hardware processing unit, a trusted hardware token, and/or any other components as necessary and/or desired.

In one embodiment, trusted hardware processing units and tokens may only be activated by acquiring the user's biometric information (e.g., face biometrics, iris, voice, fingerprint, palm print, vein scans, weight, motion and other behavioral biometrics and a combination of any of these or other biometrics).

The trusted hardware unit may then be used to perform desired transaction, such as financial/banking transactions, for the individual. These transactions may be fully encrypted.

In one embodiment, the vehicle may have multiple wallets for individual that may be registered to, or associated with, the vehicle. For example, there may be a separate wallet for the owner of the vehicle, family members, user of a corporate vehicle etc. In one embodiment, more than one individual may share a vehicle wallet.

In one embodiment, users of the vehicle system, such as drivers and passengers, may use their respective vehicle wallets personally, may transfer funds among them, may transfer funds to or from their respective vehicle wallets to a shared vehicle wallet or to another personal wallet, etc. Each individual using the system may have access and communication to the back-end financial institution resources, such as financial advisors, telepresence/conferencing capabilities, etc.

In one embodiment, a vehicle wallet may be linked to some or all of an individual's banking information (e.g., profile, accounts, etc.). In another embodiment, the vehicle wallet may be weakly linked to some or all of the individual's banking information so that no one can determine the individual's banking information from the vehicle wallet. In still another embodiment, the individual's banking information may not be connected to the vehicle wallet.

In a corporate setting, the vehicle wallet(s) may be integrated with the institutions' travel and expense system. Individuals may have access to a vehicle wallet based on employee privilege, position, etc. and may have restricted budgets uploaded to the vehicle wallet for specified types of transactions, for specified type of routes of travel, anticipated travel distances, etc.

In one embodiment, car rental payments may be executed by the vehicle wallet, and the user may use the vehicle wallet to make a payment at the beginning or end of the transaction. For example, the vehicle wallet may be temporarily assigned to the user, and the payments may be made from the vehicle wallet.

In one embodiment, a number of actions may be taken using the vehicle wallet. For example, individuals may access banking accounts. transfer funds, withdraw cash, invest funds, make person-to-person payments among passengers, etc.

In other embodiments, an individual's account and/or vehicle wallet may be used to make payments. The allocation among different accounts may be rule-based. Certain types of accounts, users, etc. may be capped to a maximum amount. For example, in a restricted use case, they may have limited access privileges.

In one embodiment, vehicles may make payments to stationary entities (such as pharmacies, drive through goods/services, tolls, parking, car registration DMV payments, government institution drive through services (e.g., taxes, registration fee, post office, etc.), auto repair shops, etc.), drive through malls, gas stations, etc. using their vehicle wallets. In another embodiment, vehicles may make payments to another vehicle, for example, through point systems or actual funds in a vehicle-to-vehicle format. The system may be used to compensate others for minor accidents, certain traffic violations, pollution/carbon charges, ad valorem taxes, etc. should any apply.

In one embodiment, drivers may prepay for certain parking locations in advance of an event.

In one embodiment, a vehicle may purchase driving information from another vehicle. For example, a vehicle may purchase information regarding traffic, detours, gas prices, weather, etc. from another vehicle that is traveling ahead of that vehicle, travelling in a different direction, taking a detour, etc. The system may use this information to optimize or alter the vehicle's route, adjust vehicle energy usage, purchase road images ahead of the road, provide warnings and alerts to the driver, change the handling/braking system characteristics for bad weather conditions, etc. This information may be provided to the vehicle control systems, both on-board and remote.

In one embodiment, vehicle wallets may interact with mobile banking resources, such as Mobile ATMs and ATM Taxis for authentication, to withdraw cash, perform transactions, etc. through local communications or direct interactions with such vehicles.

This can also tie into a "point" system, where points can be earned from carpooling, safe driving and other user behavioral profile. The vehicles can send points to each other in traffic, collect and use those points later on. For example, a user may purchase traffic information, detour information, construction, roadblocks, etc. from other drivers. The information may be used to update a navigation system, etc. In one embodiment, the vehicles may exchange points/data automatically, and the points may be used for other things, such as parking priority, etc.

In one embodiment, the vehicle wallet may be an application, part of an application, etc. The vehicle wallet may have separate settings for example, for budget allocation across a group of users. Individuals may have different access privileges for shared wallets, individual wallets, etc. For example, parents may have different access privileges than children to make payments using shared vehicle funds.

For example, different family members may use the vehicle wallet to allocate or use funds specific to themselves. Shared or common accounts may be used for other purposes.

The vehicle wallet authentication system may process each driver separately based on each driver's profile. Once the driver is authenticated, the driver may access shared vehicle funds or personalized funds/accounts as necessary and/or desired.

In one embodiment, the driver may use the vehicle wallet to conduct transactions. For example, the driver may pay for goods/services at drive-through vendors (pharmacies, dry cleaning, food, etc.), pay for parking, pay for fuel (e.g., through NFC or other communication channel), tolls, traffic fees, etc. In one embodiment, the vehicle wallet may be linked to a bank account, credit account, etc.

In one embodiment, a family may be authenticated and may share a single vehicle wallet account dedicated to the vehicle.

In one embodiment, a vehicle wallet may be loaded through NFC, iBeacon, or any other suitable type of communication. In one embodiment, the communication may be from a smart phone that may be linked, for example, to a banking account, credit account, etc.). By creating a level of separation, the driver may pay anonymously and more securely through the vehicle wallet.

In one embodiment, passengers may make person to person payments through the vehicle wallet or the vehicle wallet system.

In one embodiment, the vehicle wallet and/or vehicle wallet applications may have a range of privacy modes. For example, a private mode may not disclose the driver's name, banking information, etc. to the other participant in a transaction.

The vehicle wallet may be linked to a personal banking account, credit card account, etc. Thus, the vehicle may function as the payment device in certain situations.

In one embodiment, a driver may transfer funds via a driver's mobile electronic device, from a mobile electronic device wallet, etc. In one embodiment, the driver may send funds to, from, or through a mobile electronic device wallet in the vicinity (e.g., a parent may send funds to a driving teenager through the vehicle wallet).

In one embodiment, a shared vehicle wallet may provide multiple drivers access to a shared vehicle wallet (e.g., a family, employees sharing a company car, etc.). Each driver may have a specified level of access to the resources in the vehicle wallet. In one embodiment, the driver and/or passenger(s) may be continuously authenticated through the intelligent vehicle trusted system. In one embodiment, if the authentication fails, the connection to the system may be disconnected.

In one embodiment, the system may be deactivated and concealed under some circumstances, due to security reasons, to protect from intruders, high risk conditions (e.g., night driving), etc.

In one embodiment, different drivers may be authenticated through PINs, passwords, biometrics, etc. In one embodiment, drivers may maintain separate wallets, or may share a wallet that may be used to pay for fuel, drive through goods/services (e.g., food, retail, banking, pharmacy, etc.), parking, highway payments, car-to-car information exchange payments, other purchases, etc. In another embodiment, a custom currency may be used for vehicle-to-vehicle communications (e.g., receiving info about traffic on the road ahead).

In one embodiment, additional security features through cross-correlating driver and/or passenger information may be used. For example, if a non-authenticated driver on board, the vehicle wallet application may operate in "private" mode, providing higher security than if the driver were alone or with authenticated persons.

In one embodiment, the driver may be provided with access to mobile applications that may be customized to the driver, seat position (e.g., driver or passenger), etc. For example, a driver may be provided with access to applications/features that will minimize driver distraction, while a passenger may be provided with access to a greater range of applications/features.

In one embodiment, system and methods for collecting driver biometrics are disclosed. In one embodiment, driver behavioral profile data may be collected through vehicle sensors. Examples of such sensors include steering wheel sensors (e.g., hand position, pressure, etc.), handwriting sensors, touchpad sensors, fingerprint sensors, pedal pressure/timing sensors, front camera and impulse sensors, manual shift sensors, seat weight sensors, driver camera sensors, etc. This data may be combined with other modalities (e.g., voice recognition, etc.) for multi-modal security.

In one embodiment, data from various sensors may be integrated temporally. The resulting data may be analyzed for driver biometrics features (e.g., how the driver combines wheel, pedal, and shifting movements precisely in time, which may differentiate the driver from others).

In one embodiment, the sensors may detect fine motor skill movements, coarse motor skills movements, and event-driven response and behavioral patterns.

In one embodiment, data from additional equipment (e.g., monitoring equipment such as that used by insurance companies to monitoring driving) may be combined for impulse responses, driving behavior, etc.

In one embodiment, a driver may be authenticated while driving without any distractions. For example, the driver may not be required to enter passwords, PINs, etc. to be authenticated.

In one embodiment, the authentication information may be used to grant the driver access to the vehicle wallet.

Referring to FIG. 1, a method for driver authentication through embedded sensing is disclosed. User 115 may interact with vehicle 110, which may be a "smart vehicle." As used herein, the phrase "smart vehicle" may refer to a vehicle having built-in sensors, with added sensors, additional devices (e.g., mobile devices), etc. that may be able to sense or detect one or more characteristics of a person. Examples of such vehicles include cars, motorcycles, boats, airplanes, trains, etc. A smart vehicle or the systems/devices that typically accompany such a vehicle may be used to coordinate a user's interaction with a drive-through interface, such as a drive-through ATM, an in-person transaction, etc.

Sensors in vehicle 110 may collect biometric data from user 115, such as user 115's weight, facial characteristics, iris characteristics, fingerprint data, voice data, etc. Sensors may further detect user 115's interaction with vehicle 110, including hand movements, pedal movements, etc. Sensors may also detect user 115's responses to traffic conditions, driving habits, etc. Sensors may further detect user inputs through a variety of input devices.

Sensors may also collect data regarding vehicle 110, such as vehicle 110's position, speed, behavior in traffic, etc.

Any sensor or device that collects data about or from user 115 may be used as necessary and/or desired.

Trusted vehicle system 105 may use the data from the sensors to authenticate the user. In one embodiment, trusted vehicle system 105 may be an application that is run by vehicle 110's control systems. Trusted vehicle system 105 may be unlocked and activated through user input, such as biometric, behavioral, etc. In one embodiment, trusted vehicle system 105 may also be activated by, for example, hardware tokens. This separation and dedicated hardware unit may provide an additional level of security by using biometric-activated processing of data, full encryption, and separation from other non-trusted and potentially malicious applications that might reside in the regular system. Trusted communication system may encrypt and send/receive data from a financial institution or other institution/entity.

In one embodiment, financial services grade authentication may be used. The data may be protected both during transmission and during storage.

In one embodiment, mobile device 120, which may be registered to user 115, may collect some or all of this data, and may communicate this data to vehicle 110 or server 155 through network 150.

In another embodiment, a combination of sensors in vehicle 110 and mobile device 120 may be used.

Vehicle 110 and/or mobile device 120 may include a wallet application (not shown) that may store data regarding at least one financial instrument that may be used to conduct a transaction.

Server 155 may receive and process data received from vehicle 110 and mobile device 120. In one embodiment, server 155 may communicate the collected data, payment data, or other information to at least one entity with which user 115 wishes to conduct a transaction. Example entities include financial institution 160, automated teller machine (ATM) 170, drive-through service 180, and toll 190. These entities are exemplary only, and it should be recognized that other entities may participate as is necessary and/or desired.

Figure 2:
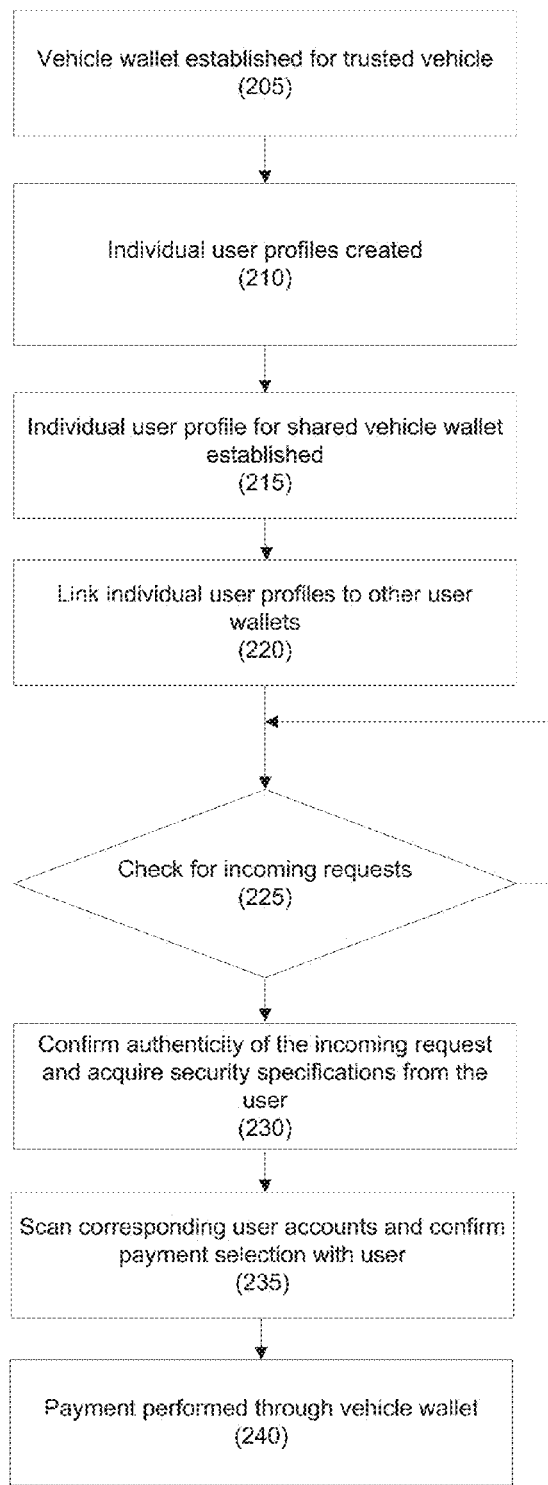
FIG. 2 is a flowchart depicting a method for driver authentication through embedded sensing according to one embodiment.

Referring to FIG. 2, a flowchart depicting a method for driver biometric-based authentication according to one embodiment is provided.

In step 205, a wallet may be established for a trusted vehicle. In one embodiment, the vehicle wallet may be limited to external fund sources, trusted vehicle security features, such as GPS tracking systems, security tokens, etc.

In step 210, an individual driver profile may be created. In one embodiment, the driver profiles may be created using password and/or PIN based authentication, driver identification, key-based identification, other biometric identification (e.g., facial recognition, voice recognition, etc.), or any other suitable technique or combination of techniques.

In step 215, an individual driver profile for a shared vehicle wallet may be established. In one embodiment, this may include setting spending limits, usage terms, authentication requirements, etc.

In step 220, individual driver profiles may be linked to one or more wallet. In one embodiment, the one or more wallet may reside on, for example, an electronic device for the driver, and that wallet may allocate funds to the vehicle wallet.

In step 225, if there is an incoming request, in step 230, the authenticity of the incoming request is confirmed and security specifications may be acquired from the driver. For example, the driver may specify anonymous payments, payments through the vehicle wallet, payments through a mobile device wallet, payments from bank account via a linked vehicle wallet, etc.

In step 235, corresponding driver accounts may be scanned and a payment mechanism selection may be confirmed by the driver.

In step 240, the payment may be made through the vehicle wallet.

Figure 3:
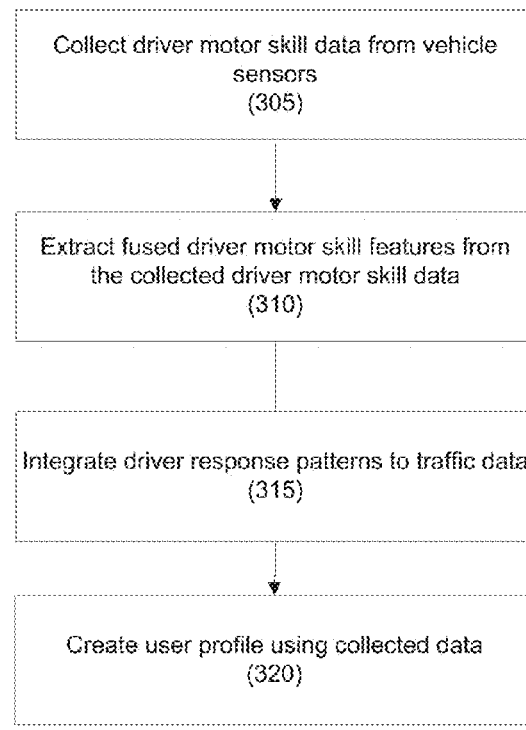
FIG. 3 is flowchart depicting a method for creating a driver profile through embedded sensing according to one embodiment.

Referring to FIG. 3, a method for ongoing authentication is provided according to one embodiment.

In step 305, driver motor skill data may be collected from, for example, vehicle sensors. For example, sensors may be provided on the steering wheel, pedals, seats, transmission, etc. In addition, cameras and/or microphones may be provided.

Examples of driver motor skill data that may be collected includes steering wheel activity (e.g., force applied, movement, etc.), pedal activity (e.g., movement, pressure, transition between pedals, etc.), manual transmission activity (e.g., pressure, shift patterns, shift points, etc.), seat activity (e.g., driver weight, seat position, etc.), driver eye activity, responsiveness to road conditions (e.g., lane tracking, distance from other vehicles), vehicle speed activity (e.g., acceleration, braking, average speed, etc.), vehicle interior volume (e.g., radio volume level, radio stations listened to, etc.), vehicle location data (e.g., routes traveled), hand/arm movements and/or gestures, eye movement patterns, any actions used to control the system, data acquired from other devices and/or systems, and any other behavioral activities as is necessary and/or desired.

After being collected, the data may be "integrated." In one embodiment, the collected data may be related to each other in the time domain. For example, if the user performs multiple tasks (e.g., clutch, shift, release clutch gas), how these multiple input patterns overlap with each other is important. Integrated markers may be extracted from the multiple input data sources. Other patterns, such as voice, language, etc. may be integrated with other data.

In step 310, fused driver motor skill features may be extracted from the driver motor skill data. Fused driver motor skill features are more than one motor skill that are related in time. For example, the timing and data collected when a driver depresses the clutch, shifts gears, and releases the clutch may be extracted. The transition from the gas pedal to the brake pedal may be extracted. The driver's response to an external stimulus (e.g., road hazard, stop lights, etc.) may be extracted. Other examples include, eye movements, facial expressions, spoken language, voice recognition, etc.

In step 315, the collected data may be integrated with real-time traffic and/or road sensor data to extract driver response patterns. For example, average road speeds sensed by traffic sensors or driver monitoring devices may be integrated with sensed vehicle speeds and other vehicle data. Examples include how the driver responds to traffic signals, how the user reacts to stop signs, how the user brakes, how the driver responds to traffic situations, etc. Data may also be sensed from traffic cameras, video recordings, images, etc.

In one embodiment, data may be sensed from on-board vehicle safety equipment. In one embodiment, this equipment may monitor vehicle speeds, following distances, etc.

In step 320, a driver profile may be created based on the motor skill data and the behavioral response. In one embodiment, the collected data from multiple sources may be analyzed, the unique identifiers/markers may be extracted from the data.

Figure 4:
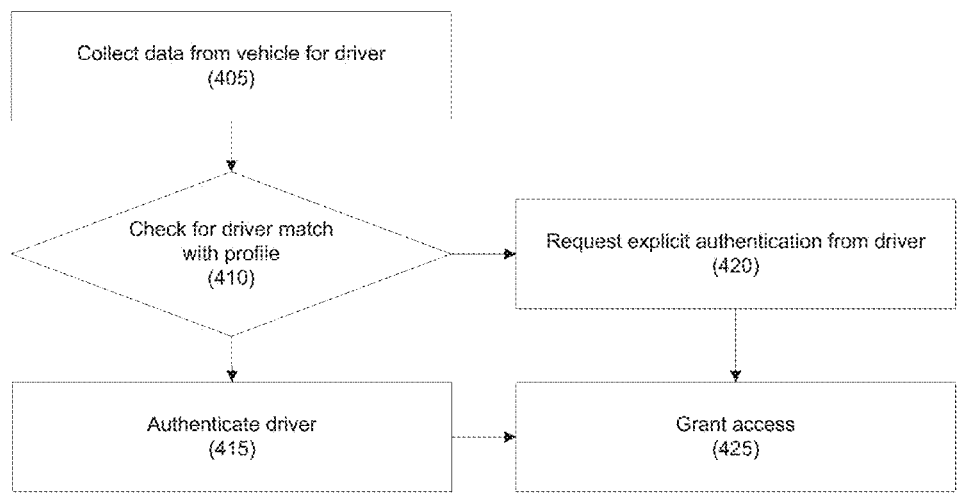
FIG. 4 is flowchart depicting a method for driver authentication through embedded sensing according to one embodiment.

Referring to FIG. 4, a method of authenticating a driver using a behavioral profile is disclosed according to one embodiment. In step 405, sensor data for a current driver may be collected. In one embodiment, motor skill data, fused data, and impulse response data may be collected.

In step 410, the collected data may be compared to the profile. In one embodiment, more than one profile may be stored on a vehicle. In another embodiment, the profile may be maintained on a device, such as a portable electronic device.

In step 415, if the collected data matches the collected data, the driver may be authenticated based on the behavioral data collected. The collected data may be integrated with other authentication modalities, including, for example, facial biometrics, voice biometrics, fingerprint biometrics, PIN and/or passwords, key token authentication, etc.

If, in step 420, the collected data does not match the profile, the driver may be requested to provide explicit authentication.

In step 425, once the driver is authenticated, the driver may be granted access to the vehicle wallet or any other desired wallet, account, activities, etc. that may be authenticated based on driver behaviors.

In one embodiment, the authentication may be used to grant the driver access to physical areas, such as garages, parking areas, restricted areas, controlled-access highways, etc.

In another embodiment, the authentication may be used to authenticate the driver to another wallet, such as a mobile wallet on the driver's mobile device. Other identification, authentication and access may be granted based on the authentication as necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized computer processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for driver authentication through embedded sensing comprising:
    a vehicle comprising:
        a plurality of sensors, a first sensor of the plurality of sensors sensing a physical characteristic of a vehicle occupant, a second sensor of the plurality of sensors sensing a movement of the vehicle occupant within the vehicle, the movement associated with the vehicle occupant's operation of the vehicle, and a third sensor that senses a different movement of the vehicle occupant within the vehicle;
        at least one computer processor executing a computer application, the computer application receiving and processing data from the plurality of sensors and extracts at least one fused motor skill from movements sensed by the second sensor and the third sensor; and
        a vehicle communication interface that communicates the processed data;
    a back-end server in communication with the vehicle communication interface that receives the processed data; and
    a plurality of transaction locations in communication with the back-end server;
    wherein at least one of the back-end server and one of the plurality of transaction locations authenticates the vehicle occupant based on the processed data.

2. The system of claim 1, wherein the physical characteristic is a biometric characteristic of the vehicle occupant.

3. The system of claim 1, wherein the plurality of transaction locations are selected from the group consisting of an automated transaction location and a manned transaction location.

4. The system of claim 1, wherein the vehicle further comprises a memory, and the memory stores a profile for the vehicle occupant based on the sensed physical characteristic of the vehicle occupant and the sensed movement of the vehicle occupant within the vehicle.

5. A method for establishing a driver profile using a plurality of embedded vehicle sensors, comprising:
    receiving, from a first vehicle sensor in a vehicle, a sensed physical characteristic for a vehicle occupant;
    receiving, from a second vehicle sensor in the vehicle, a sensed movement for the vehicle occupant within the vehicle, the sensed movement associated with the vehicle occupant's operation of the vehicle;
    receiving from a third vehicle sensor in the vehicle a different movement of the vehicle occupant within the vehicle; and
    at least one computer processor creating a vehicle occupant profile from the sensed physical characteristic and the sensed movement and extracting at least one fused motor skill from the plurality of sensed movements;
    wherein the vehicle occupant profile is used to authenticate the vehicle occupant for a transaction.

6. The method of claim 5, wherein at the different movement is associated with operating the vehicle.

7. The method of claim 5, wherein at least one of the movement and the different movement is associated with responding to a traffic situation.

8. The method of claim 5, wherein the sensed physical characteristic and the sensed movement are collected during operation of the vehicle.

9. A method for authorizing a transaction, comprising:
    retrieving a vehicle occupant profile for an occupant of a vehicle;
    receiving, from a first vehicle sensor in the vehicle, a sensed physical characteristic for the vehicle occupant;
    receiving, from a second vehicle sensor in the vehicle, a sensed movement for the vehicle occupant within the vehicle, the sensed movement associated with the vehicle occupant's operation of the vehicle;
    receiving from a third vehicle sensor in the vehicle a different movement of the vehicle occupant within the vehicle;
    at least one computer processor comparing the sensed physical characteristic and the sensed movement to the retrieved vehicle occupant profile and extracting at least one fused motor skill from the plurality of sensed movements; and
    authenticating the vehicle occupant by comparing the sensed physical characteristic and the sensed movement to the retrieved vehicle occupant profile.

10. The method of claim 9, wherein the different movement is associated with operating the vehicle.

11. The method of claim 9, wherein at least one of the sensed movement and the different movement is associated with responding to a traffic situation.

12. The method of claim 9, wherein the step of authenticating the vehicle occupant by comparing the sensed physical characteristic and the sensed movement to the retrieved vehicle occupant profile comprises:
   the at least one computer processor generating a sensed profile from the sensed physical characteristic and the sensed movement data are collected during operation of the vehicle.

13. The method of claim 9, wherein the sensed physical characteristic and the sensed movement are collected during operation of the vehicle.

14. The method of claim 9, further comprising:
   the at least one computer processor transmitting the authentication to a third party.

15. The method of claim 14, further comprising:
   the at least one computer processor granting the authenticated vehicle occupant access to a vehicle wallet; and
   the at least one computer processor conducting a transaction with the vehicle wallet.

16. The system of claim 1, wherein the back-end server authenticates the vehicle occupant based on the processed data.

17. The system of claim 1, wherein the sensed movement is one of steering, accelerating, and braking.

\* \* \* \* \*